United States Patent
Li et al.

(10) Patent No.: US 11,606,724 B2
(45) Date of Patent: Mar. 14, 2023

(54) RESOURCE ALLOCATION FOR CONFIGURABLE BANDWIDTHS

(71) Applicant: ZTE Corporation, Guangdong (CN)

(72) Inventors: Jian Li, Guangdong (CN); Yachao Liang, Guangdong (CN); Peng Hao, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/451,598

(22) Filed: Oct. 20, 2021

(65) Prior Publication Data

US 2022/0046479 A1    Feb. 10, 2022

Related U.S. Application Data

(60) Division of application No. 16/947,629, filed on Aug. 10, 2020, now Pat. No. 11,212,709, which is a continuation of application No. PCT/CN2018/076856, filed on Feb. 14, 2018.

(51) Int. Cl.
*H04W 74/00* (2009.01)
*H04W 28/20* (2009.01)

(52) U.S. Cl.
CPC .................................... *H04W 28/20* (2013.01)

(58) Field of Classification Search
None
See application file for complete search history.

(56) References Cited

U.S. PATENT DOCUMENTS

| 2009/0051496 A1* | 2/2009 | Pahlavan | H04B 1/7176 370/461 |
|---|---|---|---|
| 2015/0009939 A1 | 1/2015 | Zhang et al. | |
| 2017/0055240 A1 | 2/2017 | Kim et al. | |

FOREIGN PATENT DOCUMENTS

| CN | 105359429 | 2/2016 |
| CN | 106688295 | 5/2017 |
| WO | 2013165183 | 11/2013 |
| WO | 2013166962 A1 | 11/2013 |
| WO | 2017000903 | 1/2017 |

OTHER PUBLICATIONS

CATT "On PDSCH and PUSCH resource allocation," 3GPP TSG RAN WG1 Meeting 91, R1-1720202, Nov. 27-Dec. 1, 2017, 7 pages.
Office Action for Japanese Application No. 2020-543195, dated Oct. 8, 2021, 10 pages, with unofficial translation.

(Continued)

*Primary Examiner* — Suhail Khan
(74) *Attorney, Agent, or Firm* — Perkins Coie LLP

(57) ABSTRACT

Disclosed are methods, apparatus and systems for resource allocation when configurable bandwidths are available. One method includes performing a first transmission using a first set of resources in a first bandwidth, and subsequently performing a second transmission using a second set of resources in a second bandwidth, where the first bandwidth is greater than the second bandwidth, where the first and second set of resources are identified by a first and second value, respectively, and where a bit representation of the first value is a zero-padded version of a bit representation of the second value on either the most significant bit (MSB) or the least significant bit (LSB).

10 Claims, 8 Drawing Sheets

(56) References Cited

OTHER PUBLICATIONS

MCC Support "Draft Report of 3GPP TSG RAN WG1 #91 v0.3.0" 3GPP TSG RAN WG1 Meeting #92 R1-1800001 Athens, Greece, Feb. 26-Mar. 2, 2018, 209 pages.
Notice of Allowance for Korean Application No. 10-2020-7025710, dated Sep. 1, 2022, 7 pages, with unofficial translation.
Samsung "DL/UL Resource Allocation" 3GPP TSG RAN WG1 Meeting NR#3 R1-1716004 Nagoya, Japan, Sep. 18-21, 2017, 12 pages.
Samsung "DL/UL Resource Allocation" 3GPP TSG RAN WG1 Meeting 90bis R1-1717662, Prague, CZ, Oct. 9-13, 2017.
International Search Report and Written Opinion dated Nov. 2, 2018 for International Application No. PCT/CN2018/076856, filed Feb. 14, 2018 (8 pages).
Extended European Search Report for EP Application No. 18906683.0, dated Mar. 12, 2021, 12 pages.
Zte, et al. "Considerations on resource allocation issues", R1-1719491, 3GPP TSG RAN WG1 Meeting 91 Reno, USA, Nov. 27-Dec. 1, 2017, 14 pages.
OPPO "Resource allocation for PDSCH/PUSCH" 3GPP TSG RAN WG1 Meeting 90bis, R1-1718048, Oct. 9-13, 2017, 13 pages.
Examination report No. 1 for AU Application No. 2018408726, dated Feb. 22, 2021, 5 pages.
OPPO "Resource allocation for PDSCH/PUSCH" 3GPP TSG RAN WG1 Meeting 91 R1-1719973, Reno, USA, Nov. 27-Dec. 1, 2017, 10 pages.
Intel Corporation "Remaining details and corrections on GC PDCCH" 3GPP TSG RAN WG1 Meeting AH 1801 R1-1800324, Vancouver, Canada, Jan. 22-26, 2018, 5 pages.
Co-pending Chinese Application office action dated Dec. 28, 2022; Application No. 2018800879034, filed Feb. 14, 2018, 12 pages with unofficial translation.

* cited by examiner

S Starting RB
L Length of RBs

US 11,606,724 B2

RESOURCE ALLOCATION FOR CONFIGURABLE BANDWIDTHS

CROSS REFERENCE TO RELATED APPLICATIONS

This patent document is a divisional of U.S. patent application Ser. No. 16/947,629, filed Aug. 10, 2020, which is a continuation of and claims benefit of priority to International Patent Application No. PCT/CN2018/076856, filed on Feb. 14, 2018. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide greater flexibility in resource allocation and support a huge number of connections.

SUMMARY

This document relates to methods, systems, and devices for resource allocation in New Radio (NR) systems, for example, that provide configurable bandwidths.

In one exemplary aspect, a wireless communication method is disclosed. The method includes performing a first transmission using a first set of resources in a first bandwidth, and performing, subsequent to the first transmission, a second transmission using a second set of resources in a second bandwidth, where a first value that identifies the first set of resources is used, based on an embodiment of the disclosed technology, to determine a second value that identifies the second set of resources.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

The New Radio (NR) system, which is designed to use a much wider bandwidth than the existing Long Term Evolution (LTE) system, enables more efficient use of resources with lower control overhead. Furthermore, the introduction of the new bandwidth part (BWP) concept allows to flexibly and dynamically configure User Equipment's (UE's) operating bandwidth, which will make NR an energy efficient solution despite the support of wide bandwidth.

The concept of BWP for NR provides a means of operating UEs with smaller BW than the configured channel bandwidth (CBW), which makes NR an energy efficient solution despite the support of wideband operation. Operation using BWPs involves the UE is not being required to transmit or receive outside of the configured frequency range of the active BWP, which results in power savings.

In an example, switching from one BWP to another BWP may include specifying PDSCH or PUSCH resource allocation. This may be accomplished using a resource indication value (MV). In general, two values (e.g. number or length of resource blocks and a starting resource block) may be used to specify a resource allocation. The RIV enables representing both these values using a single value, thereby simplifying the overhead required to communicate the resource allocation specification.

Figure 1:
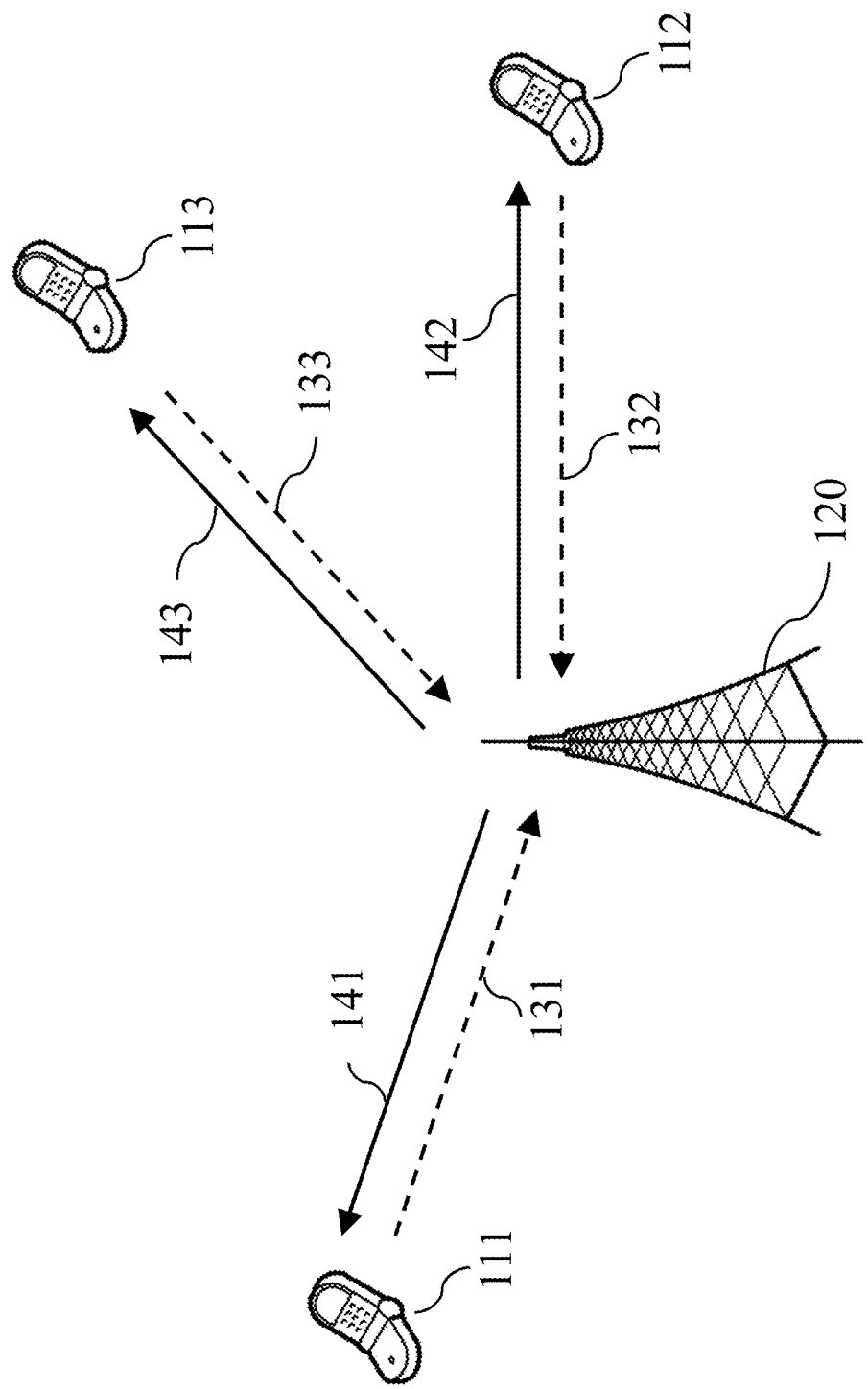
FIG. 1 shows an example of a base station (BS) and user equipment (UE) in wireless communication, in accordance with some embodiments of the presently disclosed technology.

FIG. 1 shows an example of a wireless communication system that includes a base station (BS) 120 and one or more user equipment (UE) 111, 112 and 113. In some embodiments, the UEs may perform a first transmission (131, 132, 133) using a first set of resources. In a system with configurable bandwidths, the base station may then transmit an indication to use a different BWP (141, 142, 143) to the UEs. Subsequently, the UEs may perform a second transmission using a second set of resources.

Examples of Resource Allocation (RA) in Existing Systems

In an existing NR system, a BWP index may be used to change the BWP being used by a UE. The downlink control information (DCI) is related to the BWP indicated by the index, but the interpretation of the DCI (number of bits) is determined by the current BWP. Currently, an operation that maps the DCI to a new BWP (different from the current BWP) does not exist.

In some existing systems, sizes of all DCI bitfields in DCI formats 0-1 and 1-1 in UE-specific search space (USS) are determined by the current BWP. Data may be transmitted on the BWP indicated by the BWP index. If the BWP index activates another BWP, the following transformation rules are implemented: (1) zero-pad small bitfields to match the new BWP, and (2) truncate large bitfields to match the new BWP.

In existing NR resource allocation of type 1, the DCI frequency domain resource allocation field needs $\lceil \log_2(N_{RB}$ $\lfloor (N_{RB}+1)/2 \rfloor$ bits, where $N_{RB}$ is the number of resource blocks (RBs, which may also be referred to as physical resource blocks or PRBs). In an example, if a smaller BWP (e.g. 50 RBs which needs 11 bits) needs to switch to a larger BWP (e.g. 200 RBs which needs 15 bits), the current NR system algorithm zero-pads the smaller bitfield to match the new BWP (4 zero bits are padded). The NR system defines two schemes: (1) zero-pad on the most significant bit (MSB) of the smaller bitfield, or (2) zero-pad on the least significant bit (LSB) of the smaller bitfield.

According to the mathematical definition of the RIV, zero-padding on the MSB of the bitfield implies that the RIV may only take on very small values, and therefore the length of the RBs may only take on very small values. Similarly, zero-padding on the LSB of the bitfield implies that the RIV can only take on very large values, and thus the length of the RBs may take on only very large values.

In an example, and in the case that the BWP is switching to a larger BWP, zero-padding on the LSB of the bitfield may seem more reasonable. However, if the network node (e.g. gNB) has other UEs scheduled on the RBs that occupy the part of the frequency that corresponds to RBs with high-valued indices, then zero-padding on the LSB will result in scheduling conflicts, and thus, zero-padding on the MSB might be preferable.

As discussed, the RIV may depend on number/length of resource blocks (denoted $L_{RBs}$) and a starting resource block (denoted $RB_{start}$). According to the mathematical definition of the RIV in NR, the RIVs are generated by keeping the value of $L_{RBs}$ constant and increasing the value of $RB_{start}$, which may result in a limit on the length of the RBs that may be scheduled by the UE, and which may cause resource blocking.

Numerical Example. In an example for resource allocation (RA) type 1, BWP1 uses 24 RBs (which needs 9 bits), and BWP2 uses 275 RBs (which needs 16 bits). If a UE needs to switch from BWP1 to BWP2, it needs to zero-pad 7 bits.

Assume the BWP1 bitfield is configured as 001101101.

Zero-padding on the MSB of the bitfield for BWP2 results in 0000000001101101, which is RIV=107. According to the mathematical definition of RIV, this implies that $L_{RBs}$ is 1 RB and $RB_{start}$ is the 107th RB. Alternatively, zero-padding on the LSB of the bitfield for BWP2 results in 0011011010000000, which is RIV=13952. According to the mathematical definition of RIV, this implies that $L_{RBs}$ is 51 RBs and $RB_{start}$ is the 107th RB.

Mathematical Definition. The mathematical definition of the RIV, according to the existing NR specification, cannot guarantee the monotonicity of the RIV.

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs}+1) + (N_{BWP}^{size}-1-RB_{start})$ where $L_{RBs} \geq 1$ and shall not exceed $N_{BWP}^{size} - RB_{start}$.

In particular, the "else" condition cannot guarantee the monotonicity of the RIV.

In the NR (new RAT) resource allocation of type 1, similar to the LTE resource allocation of type 2, the resource block assignment information to a UE indicates a set of contiguously allocated resource blocks within the active carrier bandwidth part of size $N_{BWP}^{size}$ PRBs. However, when DCI format 1-0 is decoded in the common search space in CORESET 0, the indication is interpreted as being for the initial bandwidth part of size $N_{BWP}^{size}$ PRBs to be used.

For NR resource allocation type 1, the $\lfloor \log_2 (N_{BWP}^{size}(N_{BWP}^{size}+1)/2) \rfloor$ LSBs provide the resource allocation in DCI format frequency domain resource allocation field, and the resource allocation field consists of a resource indication value (RIV) corresponding to a starting resource block ($RB_{start}$) and a length in terms of contiguously allocated resource blocks ($L_{RBs}$).

Typically, these two values ($RB_{start}$ and $L_{RBs}$) may be used to specify resource allocation, but using the RIV enables the representation of these two values using a single value, which would have some advantage in terms of number of bits to carry the information.

The mathematical definition for the MV, depending on the DCI format, is given as:

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size} - L_{RBs}+1) + (N_{BWP}^{size}-1-RB_{start})$ where $L_{RBs} \geq 1$ and shall not exceed $N_{BWP}^{size} - RB_{start}$.

The above definition shows that sorting order of the RIV value includes initially keeping $L_{RBs}$ constant and increasing $RB_{start}$. For example, and using the notation ($RB_{start}, L_{RBs}$),
RIV=0 is equivalent to (0,1)
RIV=1 is equivalent to (1,1)
RIV=2 is equivalent to (2,1)
$RIV = N_{BWP}^{size}$ is equivalent to (0,2)

BWP Background. A UE configured for operation in bandwidth parts (BWPs) of a serving cell, is configured by higher layers for the serving cell to use a set of at most four bandwidth parts (BWPs) for receptions by the UE (DL BWP set) in a DL bandwidth by parameter DL-BWP and a set of at most four BWPs for transmissions by the UE (UL BWP set) in an UL bandwidth by parameter UL-BWP for the serving cell.

If a bandwidth path indicator field is configured in DCI format 1-1, the bandwidth path indicator field value indicates the active DL BWP, from the configured DL BWP set, for DL receptions. If a bandwidth path indicator field is configured in DCI format 0-1, the bandwidth path indicator field value indicates the active UL BWP, from the configured UL BWP set, for UL transmissions.

Example Embodiments for RA Based on RIV Zero-Padding with Bit Indication

Figure 2:
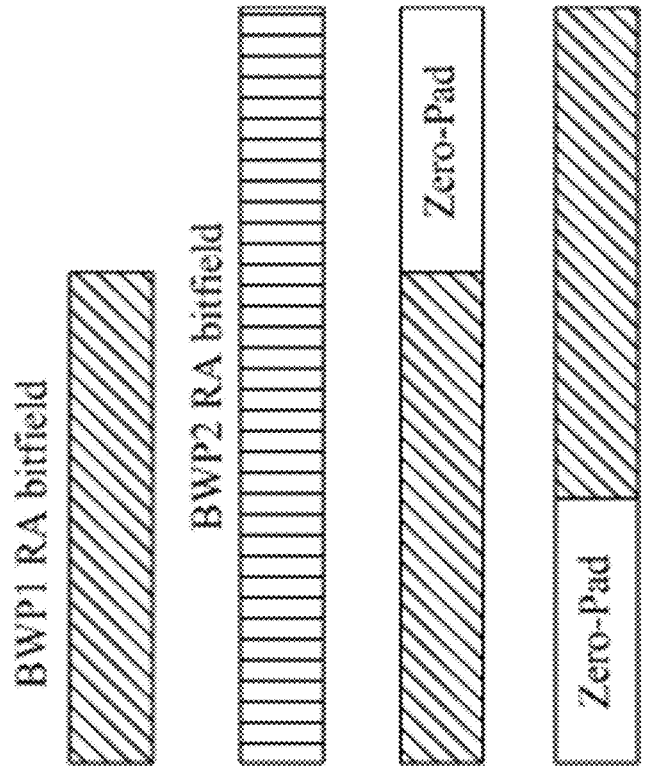
FIG. 2 shows an example of method for resource allocation for configurable bandwidths.

As shown in FIG. 2, zero-padding on the MSB or the LSB may be used to convert a bitfield associated with a first BWP to be used for a second BWP. As shown therein, the BWP1 RA bitfield can be padded on the MSB or the LSB to increase its length to be equivalent to that of the BWP2 RA bitfield. Embodiments of the disclosed technology may use an indication bit to select between zero-padding on the MSB or the LSB.

In some embodiments, the indication bit is in the frequency domain resource allocation field, e.g. an MSB of the field or a second significant bit of the field. In other embodiments, the indication bit may be an implied indication through bandwidth path indicator field, when the BWP index is different from the current BWP index.

In some embodiments, where both resource allocation type 0 and type 1 are configured, the indication bit may be used to select between a resource allocation type (e.g.

dynamic switching between RA type 0 and RA type 1). In some embodiments, the network node (e.g. eNB) may select whether the zero-padding is on the MSB or on the LSB.

Example Embodiments for RA Based on New RIV Mathematical Definition

Embodiments of the disclosed technology may use a new mathematical definition of RIV to ensure that resource blocking is eliminated. As described in the context of existing NR systems and as shown in FIG. 3B, RIV values may be determined by first keeping $L_{RBs}$ constant and increasing $RB_{start}$.

Figure 3A:
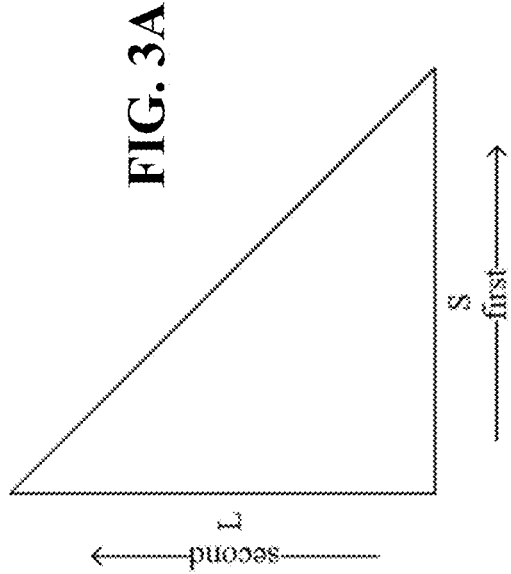
FIGS. 3A-3B show an example of another method for resource allocation for configurable bandwidths.
Figure 3B:
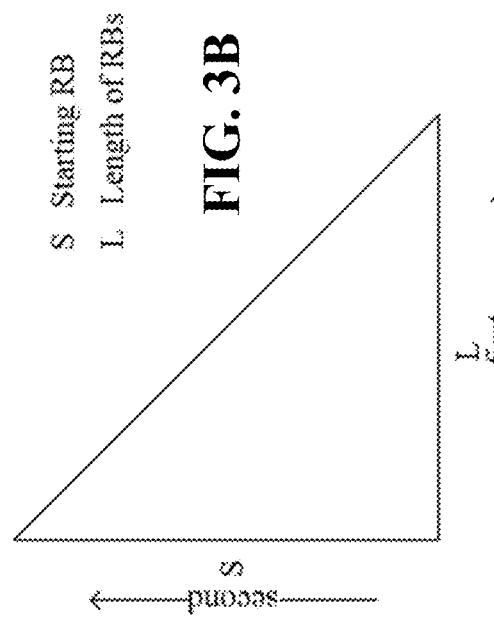

In contrast, and as shown in FIG. 3A, some embodiments of the disclosed technology determine RIV values by increasing $L_{RBs}$ from one $RB_{start}$. Then, the $RB_{start}$ values are increased keeping $L_{RBs}$ constant at a fixed value.

In an example, and using the notation ($RB_{start}$,$L_{RBs}$), a plurality of RIVs may be determined as follows:

RIV=0 is equivalent to (0,1)
RIV=1 is equivalent to (0,2)
RIV=2 is equivalent to (0,3)
RIV=$N_{BWP}^{size}$−2 is equivalent to (0,$N_{BWP}^{size}$−1)
RIV=$_{BWP}^{size}$−1 is equivalent to (1,1)
RIV=max_value is equivalent to ($N_{BWP}^{size}$−1,1)

In some embodiments, and applicable to the above scenario, the following first alternate mathematical definition for the RIV may be defined as:

if $RB_{start} \leq \lfloor N_{BWP}^{size}/2 \rfloor$ then $$RIV = N_{BWP}^{size} RB_{start} + (L_{RBs}-1)$$

else $$RIV = N_{BWP}^{size}(N_{BWP}^{size}-RB_{start}) + (N_{BWP}^{size}-L_{RBs})$$

where $L_{RBs} \geq 1$ and shall not exceed $N_{BWP}^{size}-RB_{start}$.

In other embodiments, an arbitrary starting point for the resource block index, or a maximum value of the resource block index may be used. In this scenario, a plurality of RIVs may be determined as follows:

RIV=1 is equivalent to ($N_{BWP}^{size}$−1,1)
RIV=2 is equivalent to ($N_{BWP}^{size}$−2,1)
RIV=3 is equivalent to ($N_{BWP}^{size}$−2,2)
RIV=4 is equivalent to ($N_{BWP}^{size}$−3,1)
RIV=5 is equivalent to ($N_{BWP}^{size}$−3,2)
RIV=6 is equivalent to ($N_{BWP}^{size}$−3,3)
RIV=max_value is equivalent to (0,$N_{BWP}^{size}$)
wherein RIVtarget=abs(RIVmax−RIV).

In some embodiments, and applicable to the above scenario, the following second alternate mathematical definition for the RIV may be defined as:

if $RB_{start} \leq \lfloor N_{BWP}^{size}/2 \rfloor$ then $$RIV_{temp} = N_{BWP}^{size} RB_{start} + (L_{RBs}-1)$$

else $$RIV_{temp} = N_{BWP}^{size}(N_{BWP}^{size}-RB_{start}) + (N_{BWP}^{size}+L_{RBs})$$

$$RIV = RIV_{Max} - RIV_{temp}$$

where $L_{RBs} \geq 1$ and shall not exceed $N_{BWP}^{size}-RB_{start}$.

In some embodiments, the first or second alternate mathematical definitions for the RIV may be selected based on an indication bit. In an example, the indication bit is in the frequency domain resource allocation field, e.g. an MSB of the field or a second significant bit of the field. In another example, the indication bit may be an implied indication through bandwidth path indicator field, when the BWP index is different from the current BWP index.

As is seen and described in this patent documents, the various embodiments of the disclosed technology may be combined unless the implementations expressly prohibit it. For example, the zero-padding approach may be used in conjunction with the new mathematical definitions for the RIV as seen in the following numerical example.

Numerical Example. Continuing the example described in the context of an existing NR system for resource allocation (RA) type 1, in which BWP1 uses 24 RBs and BWP2 uses 275 RBs, and the UE needs to switch from BWP1 to BWP2, it was assumed that the BWP1 bitfield is configured as 001101101.

Zero-padding on the MSB of the bitfield for BWP2 results in 0000000001101101, which is RIV=107. According to the mathematical definition of RIV, this implies that $L_{RBs}$ is 1 RB and $RB_{start}$ is the 107th RB. If the new mathematical definition for RIV is employed, this results in $L_{RBs}$ being 107 RBs and $RB_{start}$ being the 0th RB.

Zero-padding on the LSB of the bitfield for BWP2 results in 0011011010000000, which is RIV=13952. According to the mathematical definition of MV, this implies that $L_{RBs}$ is 51 RBs and $RB_{start}$ is the 107th RB. If the new mathematical definition for RIV is employed, this results in $L_{RBs}$ being 107 RBs and RR start being the 51st RB.

Example Embodiments for RA Based on RIV Sampling

Embodiments of the disclosed technology may sample (more specifically, downsample) a set of RIVs to generate an alternate set of RIVs that may prevent resource blocking. In an example, and as shown in FIGS. 4A-4C, the smaller BWP RIV states are indexed from 0 to (M−1), and the larger BWP RIV states are indexed from 0 to (N−1).

Figure 4A:
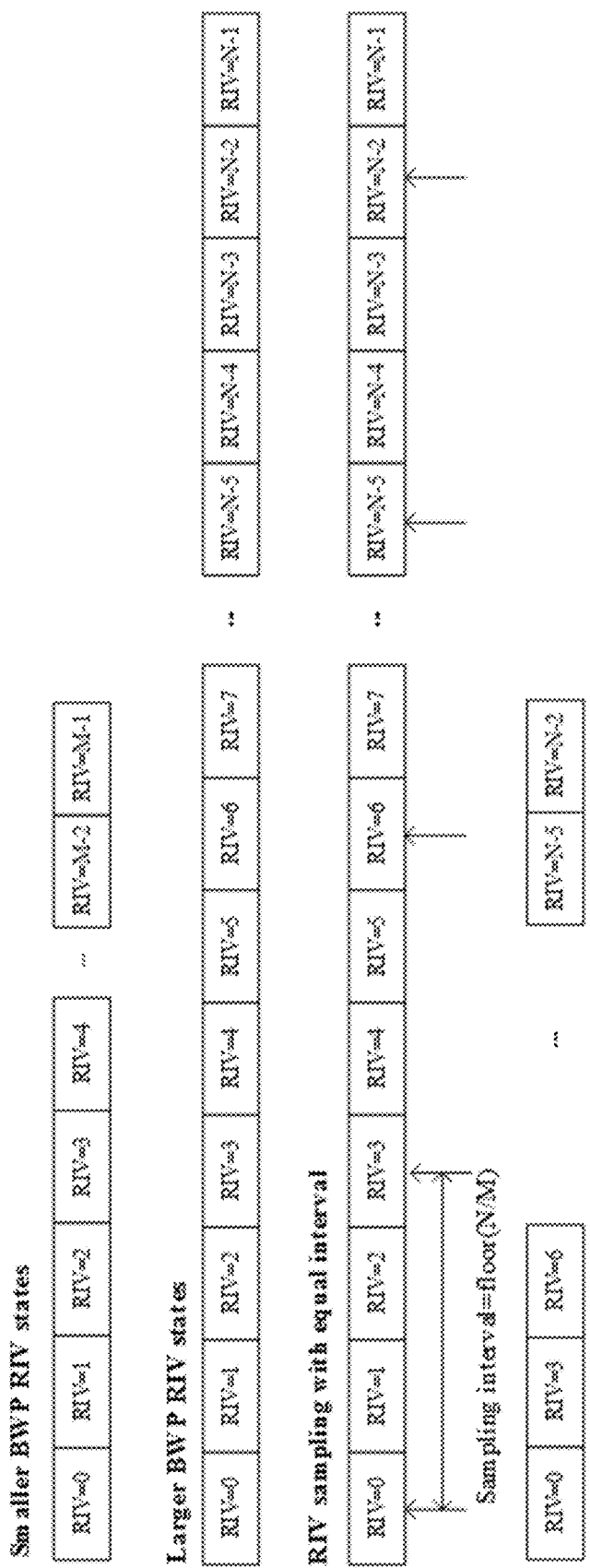
FIGS. 4A, 4B and 4C show examples of yet another method for resource allocation for configurable bandwidths.

In some embodiments, and as shown in FIG. 4A, the larger ceil(log 2(N))-bit BWP bitfield (which indicates N states) may be sampled using equal intervals. For example, a sampling interval of floor(N/M) may be used to select a subset of the states of the larger ceil(log 2(N))-bit BWP bitfield to determine the states of the smaller ceil(log 2(M))-bit bitfield.

Figure 4B:
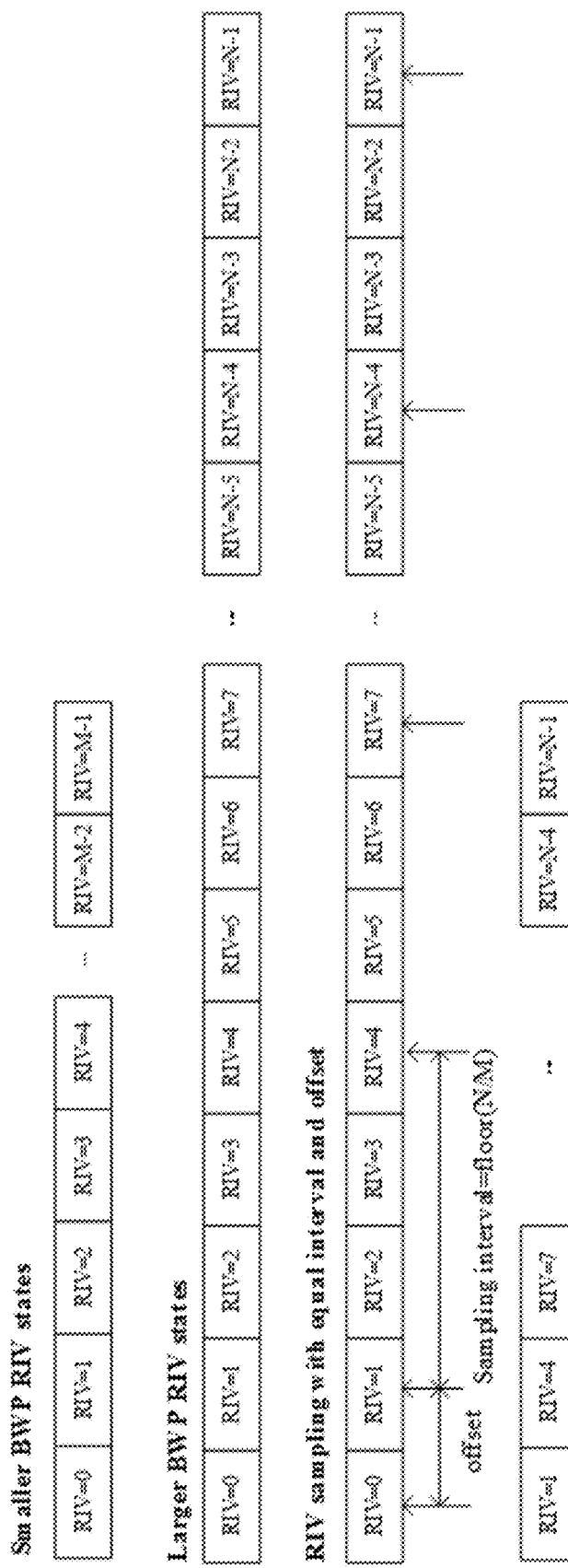

In other embodiments, and as shown in FIG. 4B, the larger ceil(log 2(N))-bit BWP bitfield may be sampled using equal intervals, and with an offset from the first state of the larger BWP bitfield. For example, a sampling interval of floor(N/M) may be used with an offset value to select a subset of the states of the larger ceil(log 2(N))-bit BWP bitfield to determine the states of the smaller ceil(log 2(M))-bit bitfield.

Figure 4C:
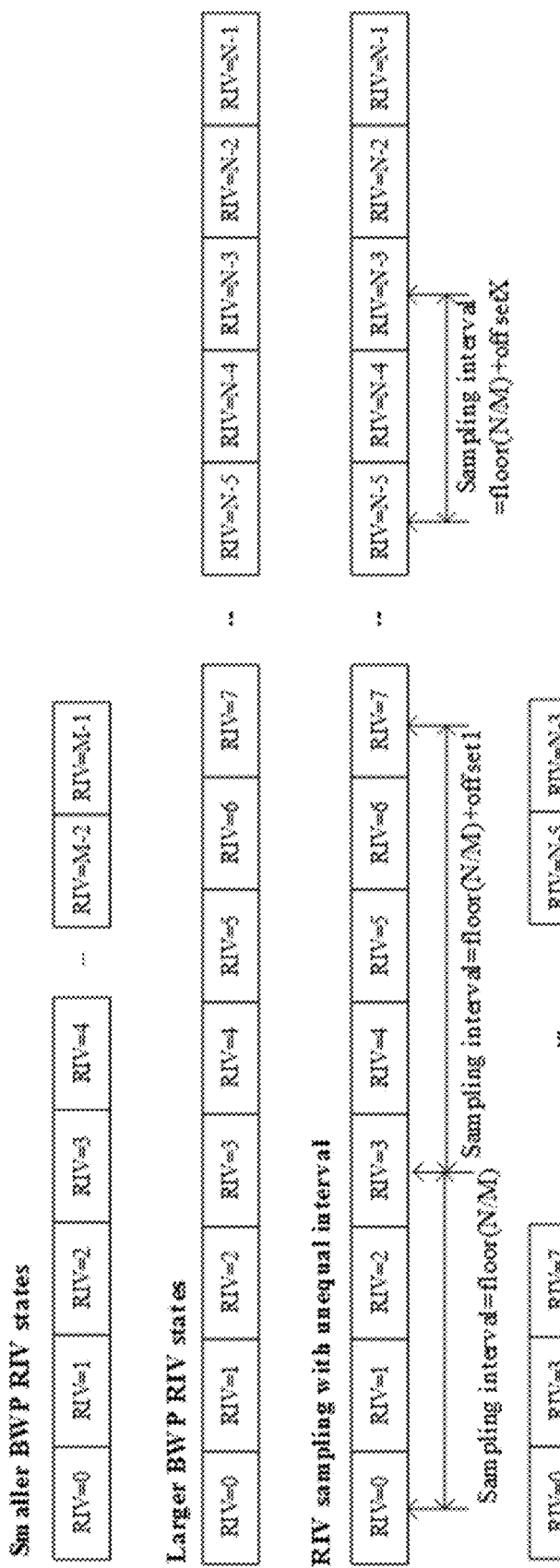

In yet other embodiments, and as shown in FIG. 4C, the larger ceil(log 2(N))-bit BWP bitfield may be sampled using unequal intervals. For example, a sampling interval of floor(N/M)+offsetY may be used to select a subset of the states of the larger ceil(log 2(N))-bit BWP bitfield to determine the states of the smaller ceil(log 2(M))-bit bitfield. FIG. 4C shows that the sampling interval may continuously vary as the larger BWP bitfield is sampled. In an example, the offsets may be predetermined and read from a table or specification. In another example, the offsets may be randomly generated. In yet another example, the offsets may be based on a portion of the smaller ceil(log 2(M))-bit bitfield. In yet other examples, the offsets may be computed in real time.

Numerical Example. In an example, the bitfield of a large BWP (e.g. 200 RBs which needs 15 bits) uses 2^15 states, whereas the bitfield of a smaller BWP (e.g. 50 RBs which needs 11 bits) only use 2^11 states. For this scenario, sampling represented by (1:2^(15-11):2^15) may be used, in either equal or unequal intervals, and with or without an offset.

In some embodiments, the sampling may be from a larger ceil(log 2(N)) set of RIV values to a smaller ceil(log 2(M)) set of RIV values as shown in FIGS. 4A-4C. For example, the states shown in FIGS. 4A-4C correspond to individual RIV values. In other embodiments, the sampling may be from a single bitfield as described in the numerical example above. For example, the states in FIGS. 4A-4C correspond to individual bits.

Example Embodiments for RA Based on RIV Monotonicity

Figure 7:
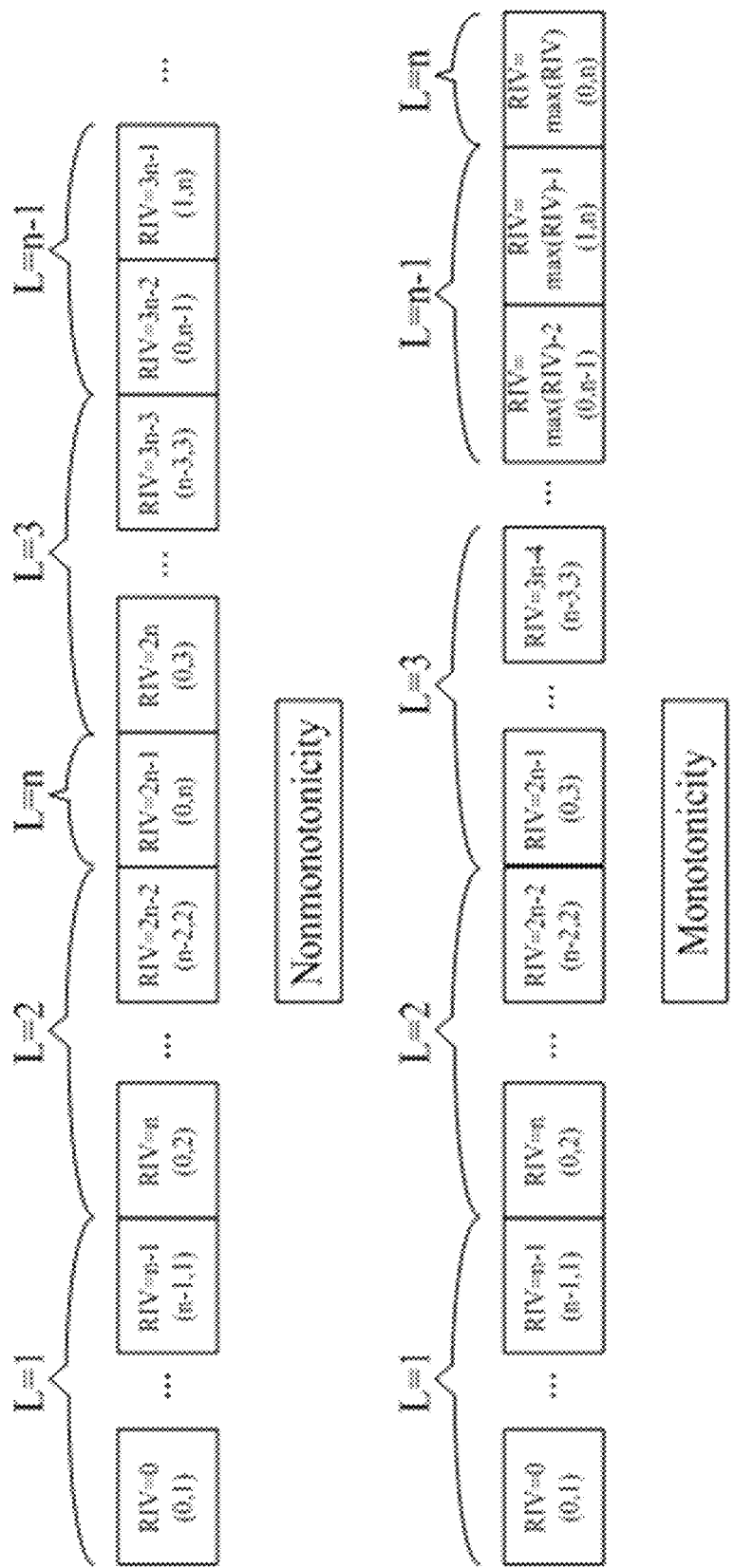
FIG. 7 shows an example of monotonicity and non-monotonicity in an exemplary method for resource allocation for configurable bandwidths.

Embodiments of the disclosed technology may modify the monotonicity of the definition in order eliminate resource blocking. The original definition of the RIV for an LTE system, and as described in the context of existing systems, the RIV value sorting order is to first keep the $L_{RBs}$ constant while increasing $RB_{start}$. However, this results in a lack of monotonicity, as shown in FIG. 7.

For monotonicity, an increase in the RIV value should correspond to $RB_{start}$ increasing when $L_{RBs}=1$, and the RIV value increasing should correspond to $RB_{start}$ increasing when $L_{RBs}=2$, and so forth. However, the restriction of $L_{RBs} \geq 1$ and this parameter not exceeding $N_{BWP}^{size} - RB_{start}$ results in $RB_{start}$ not being able to iterate through all values when $L_{RBs} > 1$. Thus, the RIV value does not always indicate the combination of $RB_{start}$ and $L_{RBs}$ that are iterated through. As shown in Table 1, the bolded/highlighted entries correspond to MV values that do not correspond to the combination of $RB_{start}$ and $L_{RBs}$ not changing monotonically.

TABLE 1

Example of a lack of monotonicity in RIV value generation

| RIV | ($RB_{start}$, $L_{RBs}$) | RIV | ($RB_{start}$, $L_{RBs}$) | RIV | ($RB_{start}$, $L_{RBs}$) |
|---|---|---|---|---|---|
| 0 | (0, 1) | 2N + 1 | (1, 3) | 3N − 2 | (1, N − 1) |
| 1 | (1, 1) | . . | . . | 3N − 1 | (0, N − 1) |
| . . | . . | . . | . . | | |
| 2 | (2, 1) | 3N − 3 | (N − 3, 3) | 3N | (0, 4) |
| 3 | (3, 1) | 3N − 2 | (1, N − 1) | 3N + 1 | (1, 4) |
| . . | . . | 3N − 1 | (0, N − 1) | . . | . . |
| . . | . . | | | . . | . . |
| N − 1 | (N − 1, 1) | 3N | (0, 4) | 4N − 4 | (N − 4, 4) |
| N | (0, 2) | 3N + 1 | (1, 4) | 4N − 3 | (2, N − 2) |
| N + 1 | (1, 2) | . . | . . | 4N − 2 | (1, N − 2) |
| . . | . . | | | | |
| . . | . . | 4N − 4 | (N − 4, 4) | 4N − 1 | (0, N − 2) |
| . . | . . | | | | |
| . . | . . | | | | |
| . . | . . | | | | |
| 2N − 2 | (N − 2, 2) | 4N − 3 | (2, N − 2) | 4N | (0, 5) |
| 2N − 1 | (0, N) | 4N − 2 | (1, N − 2) | 4N + 1 | (1, 5) |
| 2N | (0, 3) | . . | . . | . . | . . |
| . . | . . | . . | . . | . . | . . |
| 2N + 1 | (1, 3) | 3N − 3 | (N − 3, 3) | . . | . . |
| | | | | . . | . . |

In some embodiments, the monotonicity of the RIV may be corrected using the following formula given by:

If $m==0$ $RIV_{new}=RIV$ else

If $(RIV>mN-1)\&(RIV<(m+1)N-m)$ $RIV_{new}=RIV-m(m+1)/2$ else $RIV_{new}=\max(RIV)-((m-2N)(m+1)/2+RIV)$ end end where max(RIV)=the max state of the MV, where $m=[N/2]$, and where N is the bandwidth of $N_{BWP}^{size}$.

Different embodiments of the disclosed technology, e.g. zero-padding with bit indication, new mathematical definitions, sampling and monotonicity, may be combined to provide embodiments that prevent resource blocking, and provide efficient resource allocation methods when configurable bandwidths are available.

Figure 5:
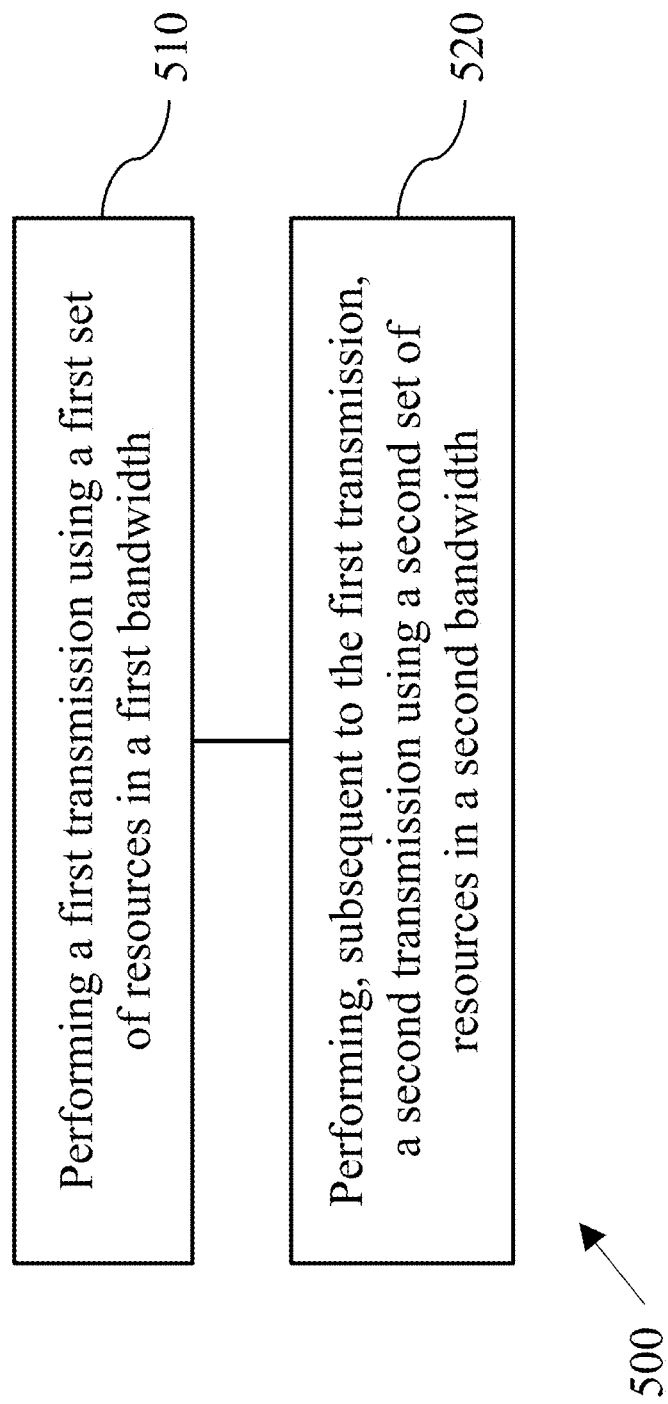
FIG. 5 shows a flowchart for an exemplary method for resource allocation for configurable bandwidths.

FIG. 5 shows a flowchart for an exemplary method for resource allocation for configurable bandwidths. The method 500 includes, at step 510, performing a first transmission using a first set of resources in a first bandwidth.

The method 500 includes, at step 520, performing, subsequent to the first transmission, a second transmission using a second set of resources in a second bandwidth. The first set of resources are identified by a first value (or a first plurality of values) and the second set of resources are identified by a second value (or a second plurality of values), and correspond to a UE switching from using the first set of resources for the first transmission to using the second set of resources for the second transmission.

In some embodiments, and as described in the context of the "Embodiments for RA Based on RIV Zero-Padding with Bit Indication" section, the bit representation of the first value is a zero-padded version of a bit representation of the second value, with the bit representation of the second value being zero-padded on an MSB or an LSB.

In some embodiments, and as described in the context of the "Embodiments for RA Based on RIV Sampling" section, the first plurality of values may be determined by selecting a subset of the second plurality of values based on relative sizes of the first and second set of resources. For example, the sampling equal or unequal, and with or without an offset.

In some embodiments, and as described in the context of the "Embodiments for RA Based on RIV Monotonicity" section, the second value is based on a first value, and is computed using a monotonic function where the first value being greater than the second value, implies that (a) a length of the first set of resources is greater than or equal to a length of the second set of resource or (b) a starting index of the first set of resources is greater than or equal to a starting index of the second set of resources.

In some embodiments, and as described in the context of the "Embodiments for RA Based on New RIV Mathematical Definition" section, the first value is of a first type that is generated by keeping a value of a first variable, e.g. $L_{RBs}$, constant and increasing a value of a second variable, e.g. $RB_{start}$, and the second value is of a second type that is generated by keeping the value of the second variable constant and increasing the value of the first variable.

Figure 6:
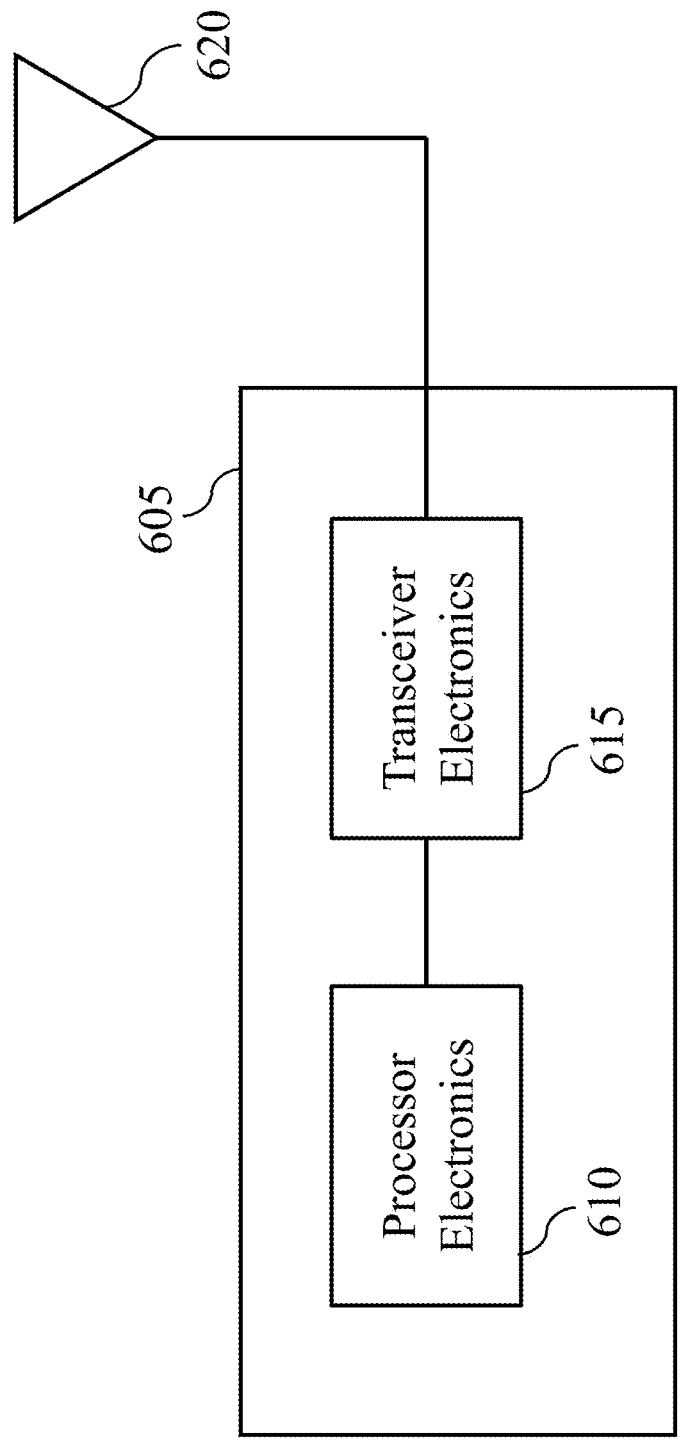
FIG. 6 is a block diagram representation of a portion of an apparatus that may implement a method or technique described in this patent document.

FIG. 6 is a block diagram of an example apparatus that may implement a method or technique described in this documents (e.g. methods 500). A apparatus 605, such as a base station or a wireless device (or UE), can include processor electronics 610 such as a microprocessor that implements one or more of the techniques presented in this document. The apparatus 605 can include transceiver electronics 615 to send and/or receive wireless signals over one or more communication interfaces such as antenna(s) 620. The apparatus 605 can include other communication interfaces for transmitting and receiving data. Apparatus 605 can include one or more memories (not explicitly shown) configured to store information such as data and/or instructions. In some implementations, the processor electronics 610 can include at least a portion of the transceiver electronics 615. In some embodiments, at least some of the disclosed techniques, modules or functions are implemented using the apparatus 605.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
performing a first transmission using a first set of resources in a first bandwidth;
performing, subsequent to the first transmission, a second transmission using a second set of resources in a second bandwidth; and
performing, subsequent to the second transmission, a third transmission using a third set of resources in the second bandwidth; and
wherein the second bandwidth is greater than the first bandwidth,
wherein the first set of resources is identified by a first plurality of values,
wherein the second set of resources is identified by a second plurality of values,
wherein the third set of resources is identified by a third plurality of values, and
wherein the third plurality of values is determined by selecting a subset of the second plurality of values based on relative sizes of the first and second set of resources.

2. The method of claim 1, wherein the first, second and third plurality of values correspond to a first, a second and a third plurality of resource indication values (RIVs), respectively, wherein the first, second and third set of resources correspond to a first number, a second number and a third number of resource blocks, respectively, and wherein the first and second bandwidths corresponds to a first and a second bandwidth part (BWP), respectively.

3. The method of claim 1, wherein the subset is selected uniformly from the second plurality of values.

4. The method of claim 1, wherein the subset is selected non-uniformly from the second plurality of values.

5. The method of claim 1, wherein the selecting the subset of the second plurality of values is further based on an offset value, wherein the offset value is based on a bit representation of the first value, wherein the offset value is selected from a set ranging from 0 to (S−1), wherein S is a sampling interval, and wherein the sampling interval is based a ratio of the sizes of the first and second set of resources.

6. An apparatus comprising a processor configured to:
perform a first transmission using a first set of resources in a first bandwidth;
perform, subsequent to the first transmission, a second transmission using a second set of resources in a second bandwidth; and
perform, subsequent to the second transmission, a third transmission using a third set of resources in the second bandwidth; and
wherein the second bandwidth is greater than the first bandwidth,
wherein the first set of resources is identified by a first plurality of values,
wherein the second set of resources is identified by a second plurality of values,
wherein the third set of resources is identified by a third plurality of values, and
wherein the third plurality of values is determined by a selection of a subset of the second plurality of values based on relative sizes of the first and second set of resources.

7. The apparatus of claim 6, wherein the first, second and third plurality of values correspond to a first, a second and a third plurality of resource indication values (RIVs), respectively, wherein the first, second and third set of resources correspond to a first number, a second number and a third number of resource blocks, respectively, and wherein the first and second bandwidths corresponds to a first and a second bandwidth part (BWP), respectively.

8. The apparatus of claim 6, wherein the subset is selected uniformly from the second plurality of values.

9. The apparatus of claim 6, wherein the subset is selected non-uniformly from the second plurality of values.

10. The apparatus of claim 6, wherein the selection of the subset of the second plurality of values is further based on an offset value, wherein the offset value is based on a bit representation of the first value, wherein the offset value is selected from a set ranging from 0 to (S−1), wherein S is a sampling interval, and wherein the sampling interval is based a ratio of the sizes of the first and second set of resources.

* * * * *